July 3, 1951 G. FRENKEL 2,559,420
APPARATUS FOR MANUFACTURE OF FILMS AND FOILS
Filed Feb. 7, 1948 6 Sheets-Sheet 1

INVENTOR
GENNADY FRENKEL, DECEASED,
BY BENJAMIN FRENKEL AND
ELIZABETH FRENKEL,
ADMINISTRATORS
by Wilkinson & Mawhinney
ATTORNEYS July 3, 1951          G. FRENKEL          2,559,420
APPARATUS FOR MANUFACTURE OF FILMS AND FOILS
Filed Feb. 7, 1948          6 Sheets-Sheet 2

Fig.2.

INVENTOR
GENNADY FRENKEL, DECEASED,
BY BENJAMIN FRENKEL AND
ELIZABETH FRENKEL,
ADMINISTRATORS by Wilkinson & Mawhinney
ATTORNEYS July 3, 1951  G. FRENKEL  2,559,420
APPARATUS FOR MANUFACTURE OF FILMS AND FOILS
Filed Feb. 7, 1948  6 Sheets-Sheet 3
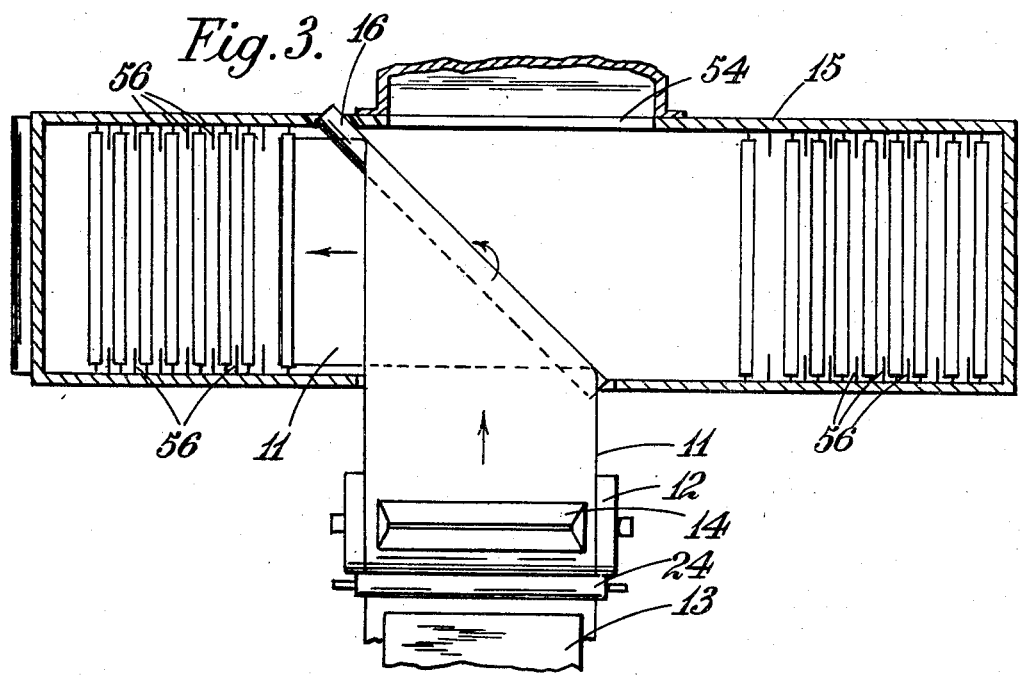
INVENTOR
GENNADY FRENKEL, DECEASED,
BY BENJAMIN FRENKEL AND
ELIZABETH FRENKEL,
ADMINISTRATORS
by Wilkinson & Mawhinney
ATTORNEYS

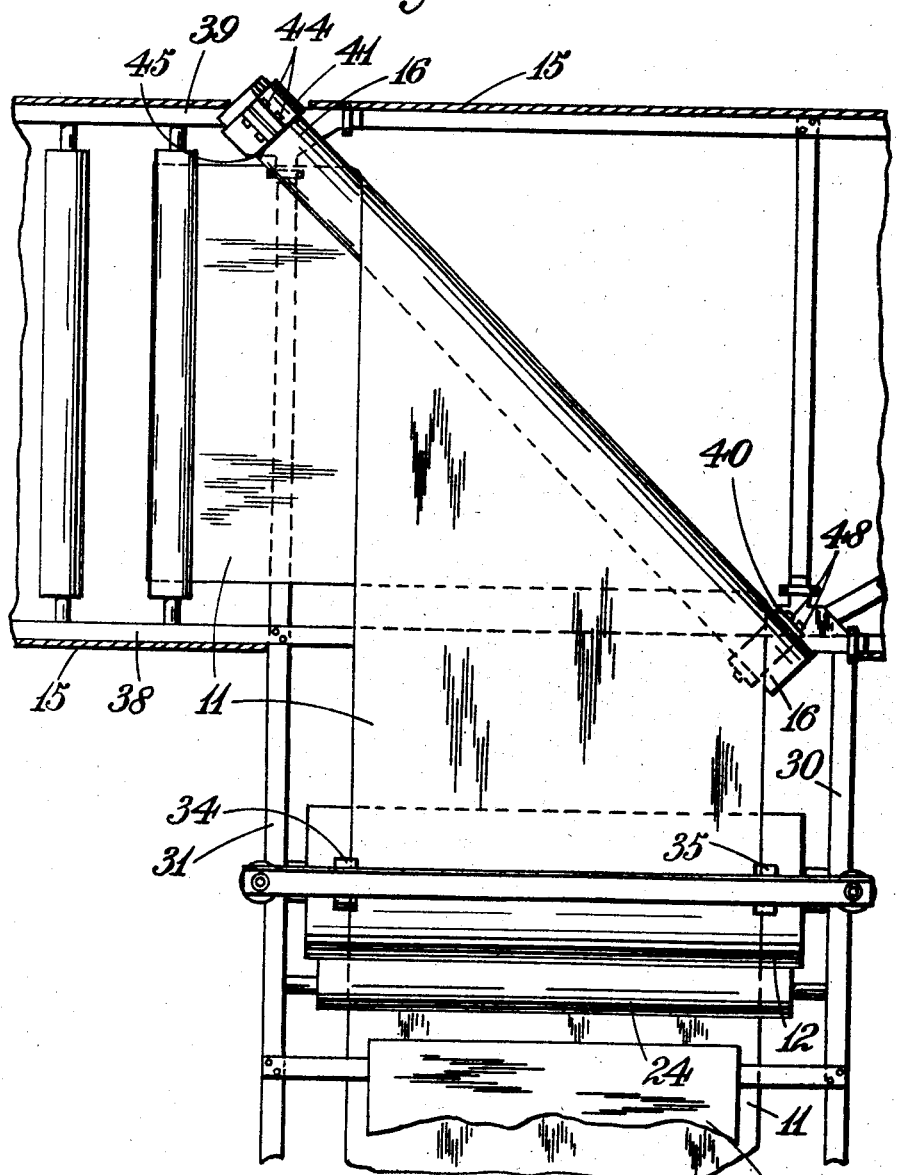

July 3, 1951
G. FRENKEL
2,559,420
APPARATUS FOR MANUFACTURE OF FILMS AND FOILS
Filed Feb. 7, 1948
6 Sheets-Sheet 5
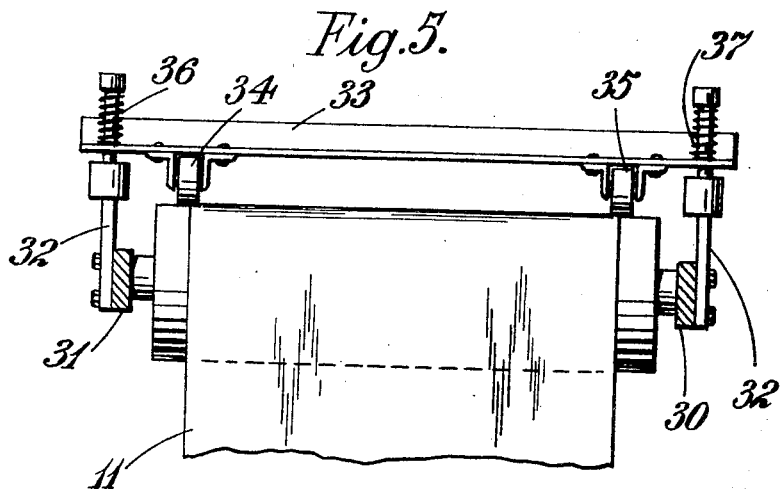
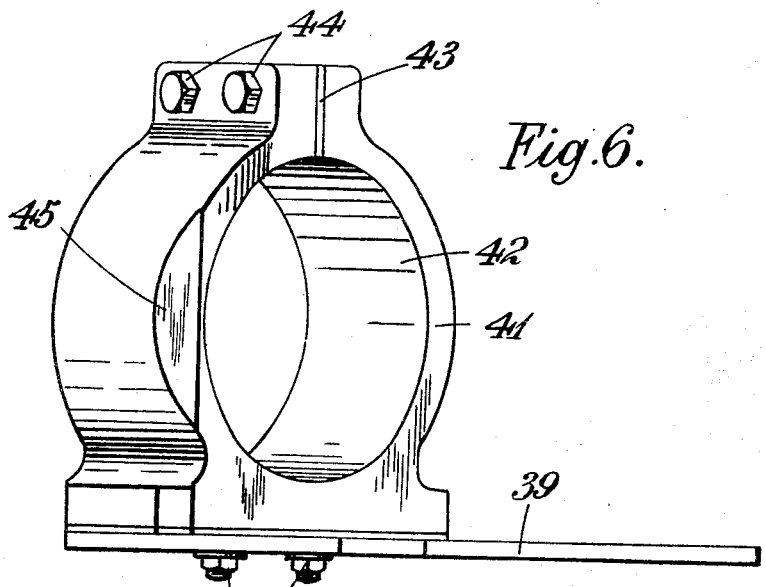
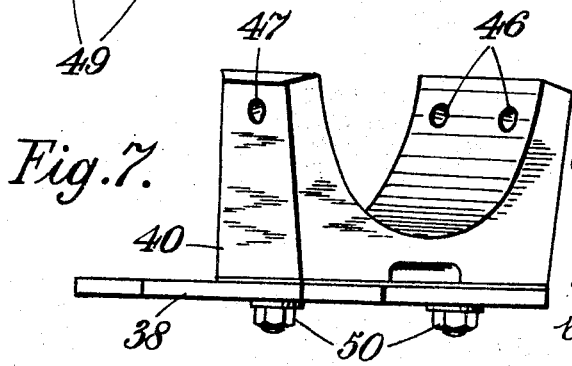
INVENTOR
GENNADY FRENKEL,
DECEASED, BY
BENJAMIN FRENKEL
AND ELIZABETH
FRENKEL,
ADMINISTRATORS
by Wilkinson & Mawhinney
ATTORNEYS July 3, 1951  G. FRENKEL  2,559,420
APPARATUS FOR MANUFACTURE OF FILMS AND FOILS
Filed Feb. 7, 1948  6 Sheets-Sheet 6
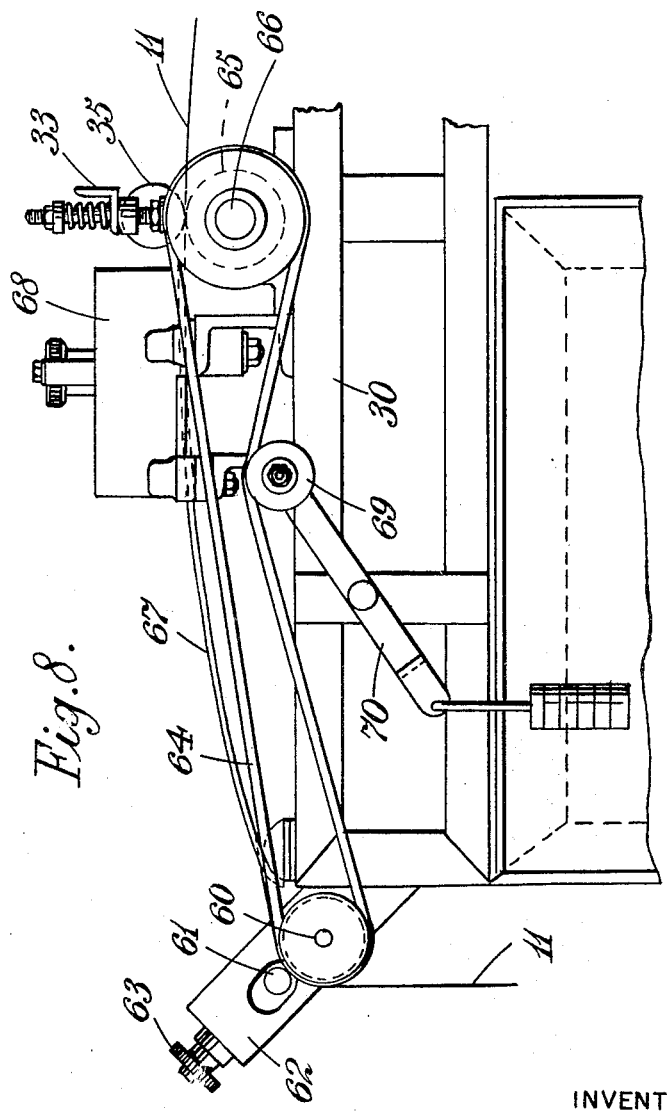
INVENTOR
GENNADY FRENKEL, DECEASED,
BY BENJAMIN FRENKEL AND
ELIZABETH FRENKEL,
ADMINISTRATORS
by Wilkinson Mawhinney
ATTORNEYS Patented July 3, 1951

2,559,420

UNITED STATES PATENT OFFICE 2,559,420

APPARATUS FOR MANUFACTURE OF
FILMS AND FOILS

Gennady Frenkel, deceased, late of Surbiton, England, by Benjamin Frenkel, London, and Elizabeth Frenkel, Surbiton, England, administrators Application February 7, 1948, Serial No. 6,982
In Great Britain January 22, 1947

3 Claims. (Cl. 18—15)

This invention comprises improvements in or relating to the manufacture of films and foils.

In the prior British patent specification No. 428,663 there is described a process of making films and foils in which a supporting band is used which moves through an apparatus, on which band a film is cast and dried and from which it is thereafter stripped, the supporting band for this purpose being unrolled from a reel before the casting operation and re-rolled on another reel after casting. The support was caused in one form of the apparatus, during the drying operation, to follow a "spiral" path, that is to say to be guided circuitously round rollers in a number of turns lying one within another, the successive turns being spaced from one another to permit the drying operation to take place.

The process according to the said prior patent was not continuous. At the end of each run of the supporting band the band had to be changed and either another band run through the machine or the original band transferred to the feed end of the machine and re-started. It is an object of the present invention to provide an apparatus which will run continuously.

To this end, this invention provides an apparatus for casting films and foils comprising in combination an endless supporting band, guides for the band to cause it to travel in a "spiral" path, means for directing the band laterally, at or beyond the ends of the spiral path, along another path transverse thereto and back again, means for casting film on foil on the band before entry to the spiral path and means for stripping dried foil off the band at or beyond the exit end thereof.

Preferably the means for directing the supporting band laterally comprise guide bars set diagonally across the direction of advance of the supporting band so that the band can be led around the guide bars.

The band may be led in a horizontal or substantially horizontal direction around a diagonal guide-bar, the means for casting film or foil material onto the band being located above the band on its way in, and means provided for stripping the material off the band upon or after its emergence from the "spiral" together with further diagonal guide means to direct the material after emergence from the spiral into a path, the sides of which lie in the same planes as the sides of the film on its way into the spiral, so that it may readily be led back again.

The supporting band may be housed, over its spiral path, in a casing and air-supply means are provided to direct a current of air between the turns of the spiral.

The band may be of non-absorbent paper, specially treated or coated paper, thin metal or any other suitable material.

It has previously been proposed to cast films upon an endless band, but in these cases the endless band was stretched between two drums and therefore involved a very long horizontal drying chamber, taking up an undue amount of floor space. Moreover, such a long chamber necessarily has a large volume, and therefore the drying air dilutes too much the vapours of solvents which come off from the film so that solvent recovery is not economical. If the chamber is shortened, the speed of operation has to be reduced, but the present invention permits the employment of a compact drying chamber in which the path for the film is a long one, so that high speed operation can be accomplished without involving such a large air capacity as to render solvent recovery uneconomical. As compared with the aforesaid prior patent specification No. 428,663 the present invention permits continuous operation, and therefore a higher output.

Preferably the air supply according to the present invention is directed in at or about the outlet end for film from the spiral, and out at or about the inlet end for film. In this way air flows in counter current to the film between the turns of the spiral, which not only ensures a more efficient drying operation and, therefore, the posibility of a higher speed of the supporting band through the apparatus, but also the quantity of air used for drying is economised, and the concentration of solvent in the air at the outlet for air from the machine is higher so that solvent recovery is facilitated.

The following is a description by way of example of one construction of machine in accordance with the invention, reference being made to the accompanying drawings in which—

Figure 2 is a cross section upon the line 2—2 of Figure 1 looking in the direction of the arrows;

Figure 3 is a horizontal section upon the line 3—3 of Figure 1 looking in the direction of the arrows;

Figure 4 shows in greater detail some of the parts shown in Figure 3;

Figure 5 is a detail showing in front elevation the arrangements for guiding the supporting band at its entries to the machine;

Figures 6 and 7 are details of brackets, and

Figure 8 is a detail of a modification.

Figure 1:
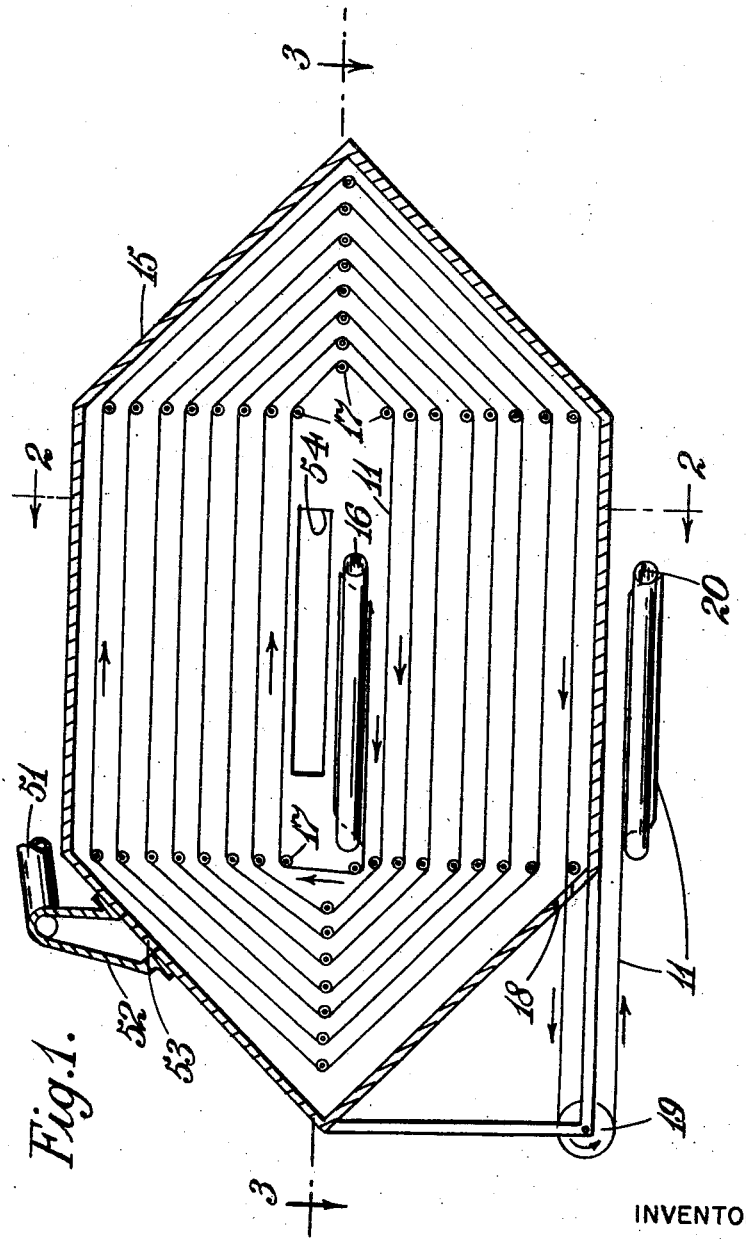
Figure 1 is a diagrammatic vertical section through the machine.

Referring first to Figures 1, 2 and 3, the machine comprises a number of rollers over which runs a supporting band 11. One of the rollers 12 is arranged at a convenient height behind a platform 13 on which an operator can stand, and above which is a hopper 14 for casting a film of a plastic material dissolved in a volatile solvent or dispersed in a volatile medium on to the band 11. The supporting band may be of any suitable material such as strong non-absorbent kraft or manila paper specially treated or coated paper, or of thin polished metal. The material to be cast may be any of the materials which are normally made into films by a casting process such, for example, as a cellulose derivative, rubber-like material or material such as a polyvinyl compound or any other material which can be formed into a film by casting on a support and evaporating solvents or dispersion media therefrom. The bottom of the hopper 14 has the usual adjustable slit through which the thin film of the solution is poured on to the support below, and as film-casting hoppers are well known in themselves it is unnecessary to give details of this part of the apparatus in this specification. From the film-casting hopper 14 the support 11 passes in a horizontal direction into a drying chamber 15, within which there is disposed a non-rotatable guide bar 16 set diagonally to the line of advance of the film at an angle of 45°, as best seen in Figure 3 of the drawing. The supporting band is led over the guide bar 16 and around it, and as a result is turned through an angle of 90°, and is thence led in a "spiral" path, as shown in Figure 1 of the drawing, around a large number of rollers 17 which are disposed parallel to one another, the ends of the rollers being supported in suitable bearings in side frames attached to the walls of the casing of the chamber 15. The rollers 17 are disposed as can be seen from Figure 1 so as to support the band 11 and cause each turn of the spiral to form a six-sided figure, the successive turns becoming bigger until at the last turn the band is close to the outer wall of the chamber 15, and thence passes out through a slot 18 in a horizontal direction over a guide roller 19 and so back to a second diagonal guide bar 20. The guide bar 20 is located immediately beneath the guide bar 16 and parallel to it, and it causes the supporting band to turn again through a right angle into a path parallel with that in which it was travelling over the roller 12. The band 11 is led from the diagonal guide bar 20 beneath the platform 13 under a roller 21 over a stripping roller 22, and thence under further guide rollers 23, 24 beneath the platform back to its starting point.

On the stripping roller 22 the dry film is stripped from the support 11, and is led upwards under a roller 25 to a winding-up roll 26 on which it is collected. A stripping knife 27 bears on the upper surface of the supporting band 11 at the stripping point to assist in ensuring that the cast film comes away properly. It is unnecessary to dwell upon the stripping operation or upon the correct choice of material for the band 11 to afford the desired finish to the cast film, as the requirements for these are well known. It will be observed that the operator on the platform 13 is in a convenient position for attending to both the film casting operation from the hopper 14 and the stripping operation from the stripping roller 22, and for inspecting the film as it is rolled up.

As the supporting band 11 is of a substantial width and of great length, and runs over a great many rollers, it will be appreciated that it is of importance to ensure that the rollers are correctly set to avoid any tendency of the band to wander to one side during operation, and in particular that the diagonal guide bars 16 and 20 should be set at the correct angle to turn the band through exactly the angle required to lead it into parallelism with the rollers 17 at the inlet, and to turn the band again into parallelism with its original direction as it goes over the guide bar 20. The guide bars 16 and 20 are highly polished and chromium plated in order to reduce friction. It will be appreciated that they do not rotate, because if they rotated they would tend to work the band laterally. The supporting means for the guide bars are indicated in greater detail in Figures 4 to 7.

Referring to Figure 4, which is a plan of some of the parts shown in Figure 3 but to a larger scale and showing the framework also of the machine, it will be seen that the roller 12 is carried in bearings in side frames 30, 31. The side frames also support at each side of the band 11 a bracket 32 (Figure 5) which extends upwardly and affords a vertical guide for a horizontal angle bar 33. The angle bar carries guide rollers 34, 35 which are spaced apart so that their inner edges correspond to the width of the supporting band 11. These guide rollers 34, 35 are pressed down upon the upper surface of the roller 12 by springs 36, 37 on the brackets 32, and they serve to ride upon the edges of the supporting band 11 and to help to keep the band in position and under proper tension. The hopper 14 has been removed in the view shown in Figures 4 and 5, but is, of course, carried close to the angle bar 33 upon the side frames 30, 31. These side frames are joined to framework 38, 39 by the casing 15. The frame members 38, 39 support brackets 40, 41 which maintain the guide bar 16 in its correct position. As can be seen from Figure 6, the bracket 41 which is bolted securely to the frame member 39 is bored out at 42 to fit the guide bar 16, and it is split at 43 and is capable of being contracted so as to grip the guide bar firmly by screwing up bolts 34. One corner of the bracket is bevelled off as shown at 45 to ensure that it does not foul the edge of the supporting band 11.

At the other edge of the band the bracket 40, which is shown in detail in Figure 7, is made as a kind of saddle which receives the lower part of the bar 16, and is provided with holes 46, 47 to receive said screws 48. The said screws 48 can be seen in Figure 4 of the drawing, and they pass freely through the material of the bracket 40 and are screw threaded into the roller 16. The reason that this support is made saddle shaped rather than embracing the whole circumference of the roller like the bracket 41, is to avoid its upper portion fouling the underside of the band 11 as it passes over the bar 16.

A similar arrangement of brackets supports the bar 20 beneath the casing 15. The brackets 40 and 41 are held down on the frame members 38 and 39 respectively by studs fitted with nuts 49, 50, and when securing the brackets in place it is possible to adjust the angle of the bars 16 and 20 very accurately just before the nuts 49 and 50 are finally tightened up, so as to ensure that the band runs correctly. Of course, the rollers 17 must all be carefully arranged to be parallel to one another.

A conduit 51 for heated drying air is provided which leads into inlet box 52 secured on the outer wall of the casing 16 above the inlet opening 53 (Figure 1). The air enters the drying chamber through the opening 53, and works its way between the turns of the spiral in the opposite direction to that of the movement of the supporting band 11 until it reaches the space in the centre from which it is removed through an outlet 54 leading to a conduit 55. The conduit 55 is taken to a solvent recovery plant.

If the supporting band 11 is wide enough to reach close to the walls of the casing 15, it is unnecessary to provide any partitions between the successive turns of the spiral formed by the band. Without any partitions between the turns, the successive turns of the spiral may be made closer together without any risk of one turn touching the next, and thus the size of the chamber 15 can be reduced. It may, however, be desirable if there is a substantial space between the edges of the band and the sides of the casing, to have short ribs projecting inwardly from the walls of the casing between the edges of the turns of the spiral, as shown at 56 in Figures 2 and 3 of the drawing. In other circumstances the ribs 56 may be extended to form complete partitions across the chamber from side to side. Ribs or partitions serve to prevent the drying air finding a direct path from the inlet 53 to the outlet 54 down the sides of the drying chamber.

Instead of leading the film on to a film reeling roller after it has been stripped it can be led into a further drying chamber through which it is caused to take a zig-zag path, or a path in which it hangs in festoons. Air from this drying chamber can be used as the air which is led into the drying chamber through which the support passes. If this is done the speed of movement of the support can be accelerated considerably because the film need not be thoroughly dried before stripping. It is found that 80% of the drying, that is to say of the solvent removal, takes place in one-fifth of the total drying time and the film becomes sufficiently dried to be non-tacky and to be strippable long before it is sufficiently free of solvent to be reeled; hence the increase of speed permissible.

In certain circumstances it may be desirable to insert in the drying chamber some form of heating unit or units in order to help to maintain the temperature of the drying air at a suitable value. Such units could conveniently be located between one or more of the lines of rollers 17, which are seen in Figure 1 of the drawing, as in this position they are not affected by any sag of the support.

Referring to Figure 8 of the drawing, this shows an alternative means of casting to the hopper 14 over the roller 12 of Figure 1. In this case the support 11 is led upwardly over a small roller on a shaft 60 supported by the side frames 30, 31 already referred to, and is pressed against this roller by a pressure roller 61 carried on a slide in a bracket 62 secured to the frame. The slide is adjustable by a hand wheel 63 so that the pressure can be regulated, and the shaft 60 is driven by a band 64 from a pulley 65 on a shaft 66 located close to the inlet to the casing 15. The casing 15 is not shown in Figure 8 of the drawing, but lies to the right hand side of the figure, and the shaft 66 carries a supporting roller over which the band 11 passes and which works in conjunction with the bar 33 and rollers 34, 35 already described.

Between the shafts 60 and 66 there is a convex apron of material 67, which acts as a support for the band 11 and leads the band beneath a pouring hopper 68 before it reaches the roller on the shaft 66. The apron 67 has a horizontal portion beneath the hopper 68 which may be referred to as a pouring table. This construction obviates the use of a large and expensive roller such as the roller 12 shown in Figures 4 and 5. In order to keep the driving band 64 taut a jockey pulley 69 is provided on a counterweighted lever 70.

What is claimed is:

1. Apparatus for casting films and foils comprising in combination an endless supporting band, guides for the band to cause it to move outwardly in a "spiral" path for part of its travel, a guide bar at the centre of the "spiral" around which the band passes which guide bar is set diagonally across the direction of advance of the band to guide the band into the spiral path as it advances, means to guide the band in a horizontal or substantially horizontal direction past a casting position toward the guide bar, casting means located above the band where it approaches the guide bar to cast film material on to the band, means for stripping the cast material off the band after its emergence from the spiral, a further diagonal guide bar to direct the band after emergence from the spiral into a path, the sides of which lie in the same plane at right angles to the band surface as the sides of the path of the film on its way into the spiral and means beyond the said further diagonal guide bar to guide the band back to the casting position.

2. Apparatus as claimed in claim 1 wherein the supporting band is housed, over its spiral path, in a casing, and air supply means are provided to direct a current of air between the turns of the spiral.

3. Apparatus as claimed in claim 2 wherein the air supply is directed in at the outlet end for film from the spiral and out at the inlet end for film.

BENJAMIN FRENKEL,
ELIZABETH FRENKEL,
*Administrators of the Estate of Gennady Frenkel, Deceased.*

REFERENCES CITED

The following references are of record in the file of this patent:

UNITED STATES PATENTS

| Number | Name | Date |
|---|---|---|
| 1,401,965 | Crowell | Jan. 3, 1922 |
| 2,096,232 | Ensign | Oct. 19, 1937 |

FOREIGN PATENTS

| Number | Country | Date |
|---|---|---|
| 396,398 | Great Britain | Aug. 10, 1933 |